(12) United States Patent
Hegyi

(10) Patent No.: US 7,904,875 B2
(45) Date of Patent: Mar. 8, 2011

(54) CONFIGURING AND ALLOCATING SOFTWARE PRODUCT TECHNICAL SERVICES

(75) Inventor: Marco Armand Hegyi, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1232 days.

(21) Appl. No.: 11/299,444

(22) Filed: Dec. 12, 2005

(65) Prior Publication Data

US 2007/0234272 A1 Oct. 4, 2007

(51) Int. Cl.
*G06F 9/44* (2006.01)

(52) U.S. Cl. ......... 717/103; 717/100; 717/101; 717/102; 717/120; 717/121; 717/122; 717/123

(58) Field of Classification Search ................... 717/101, 717/102, 103, 104
See application file for complete search history.

(56) References Cited

U.S. PATENT DOCUMENTS

| | | | | |
|---|---|---|---|---|
| 4,796,220 | A * | 1/1989 | Wolfe | 705/56 |
| 5,485,615 | A * | 1/1996 | Wennmyr | 717/109 |
| 5,832,451 | A * | 11/1998 | Flake et al. | 705/5 |
| 5,875,330 | A * | 2/1999 | Goti | 717/104 |
| 6,161,113 | A * | 12/2000 | Mora et al. | 715/234 |
| 6,256,664 | B1 * | 7/2001 | Donoho et al. | 709/204 |
| 6,370,573 | B1 * | 4/2002 | Bowman-Amuah | 709/223 |
| 6,519,571 | B1 * | 2/2003 | Guheen et al. | 705/14.66 |
| 2003/0009740 | A1 * | 1/2003 | Lan | 717/102 |
| 2004/0107125 | A1 * | 6/2004 | Guheen et al. | 705/7 |
| 2004/0268294 | A1 * | 12/2004 | Budd et al. | 717/103 |

FOREIGN PATENT DOCUMENTS

IE 78016 B3 * 1/1998

OTHER PUBLICATIONS

Schmidt et al. 1999. Computers & Graphics. vol. 23, pp. 893-901. "There is more to context than location".*
Lakhani et al. 2001. Research Policy. vol. 32, pp. 923-943. "How open source software works".*
Thomas, Roshan K. Team-based Access Control (TMAC): A Primitive for Applying Role-based Access Controls in Collaborative Environments. Proceedings of the second ACM workshop on Role-based access control [online] (Nov. 17, 2009). ACM, pp. 13-19. Retrieved From the Internet <http://portal.acm.org/citation.cfm?id=266748>.*

* cited by examiner

*Primary Examiner* — Emerson C Puente
*Assistant Examiner* — Jonathan R Labud
(74) *Attorney, Agent, or Firm* — Workman Nydegger

(57) ABSTRACT

The present invention extends to methods, systems, and computer program products for configuring and allocating software product technical services. A service policy configuration defining one or more service models for the developing software product is received. A software product taxonomy, including one or more themes and corresponding technical services, for the developing software product is received. A service profile, including context on how the entity intends to utilize the developing software product, is received. The entity is authorized to utilize technical services associated with the developing software product in accordance with one of the service models in response to receiving the service profile. In other embodiments, a service request selection is made from a menu that lists themes and technical services associated with a software product. The service request is allocated to the identified service provider based on request allocation criteria. An entity is at least notified of a received answer.

20 Claims, 3 Drawing Sheets

CONFIGURING AND ALLOCATING SOFTWARE PRODUCT TECHNICAL SERVICES

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the communication (e.g., the exchange of electronic messages) between a number of computer systems and/or other electronic devices via wired and/or wireless computer networks.

Accordingly, there are an enormous variety of functions and applications that may be implemented by a general purpose computing system in response to the execution of a software application. The utility and functionality of the computing system does, however, rely on the proper coding of the source code that was compiled or interpreted into the binary instructions that are actually executed by the processor. If there is a coding or design error, this will often result in a deviation from expected behavior.

Further, in many computing environments, software from one vendor can depend on proper coding of and interoperation with software from another vendor. For example, an application program developed by a first vendor can depend on proper coding of and interoperation with an operating system developed by a second vendor. Thus, when a vendor has a substantial number of other vendors dependent their software, the vendor will often permit the other vendors access to their software before the software is publicly released. For example, an operating system vendor may give copies of pre-release (beta) versions of its operating system to application program vendors that develop applications for use with the operating system. The application program vendors can then use the pre-release versions to develop application programs for use with the operating system. This allows the application program vendors to have their applications ready for release much closer to (if not at) the time the operating system is released to the public.

As a result, it may be that dependent software is under development simultaneously with other software it depends on. For example, an operating system and a database program designed for use with the operating system can be under development at the same time. Thus, it is likely that the vendor of the dependent software will have questions (e.g., design and architecture questions) about the other software it depends on. Further, it is likely that the vendor of the dependent software will discover unexpected performance deviations (bugs, errors, incompatibles, undocumented functionality, etc.) of the other software it depends on.

In most development environments, efforts are made to reduce the number of unexpected performance deviations in developed software. However, the creativity of software programmers and designers has led to increasingly complex and powerful software applications. As the complexity of the software application increases, so often does the potential for coding and design errors that can cause unexpected performance deviations. Thus, it is almost inevitable that unexpected performance deviations will occur. Accordingly, it is also almost inevitable that a vendor whose software is relied on by other vendors will have to provide the other vendors with at least some advisory and technical support services during the development process.

Many vendors use telephone support, newsgroup postings, and electronic mail to provide other vendors with advisory and technical support service for their in-development (beta) software. For example, a developer of a spreadsheet application may send an electronic mail message to an operating system vendor to ask a question of or report a bug to the operating system vendor. In response, the operating system vendor may call the developer or post a news group message with the answer to the question or to provide a bug fix.

Some vendors use community-supported online newsgroups that leverage the goodwill of technical enthusiasts. However, community-supported online newsgroups are only useful when the subject matter is of interest to knowledgeable volunteers and the vendor surrenders confidentiality. Newsgroups also have limited reliability since there is no accountability to respond or be accurate. Further, in general, self-service systems for pre-released software are expensive to build since pre-released software is unstable and often not well documented. Knowledge bases have been used to avoid some of the cost. However, knowledge bases lack the context of a developer's situation to solve specific problems.

Accordingly, advisory and technical support services are typically provided by paid software engineers that allocate their time on an hourly or incident basis. As a result, advisory and technical support services for pre-release and/or in-development software is typically human resource intensive. The vendor must attempt to manage the high cost of using the necessary specialty trained software engineers. Further, due at least in part to the mechanisms typically used to contact a vendor, the vendor may be provided little, if any, additional context (e.g., operating environment, computer system specifications, etc) on how their software is being used. Thus, it is often difficult for a vendor to determine, which, if any, engineer is to receive the communication and how the communication is to be escalated.

BRIEF SUMMARY

The present invention extends to methods, systems, and computer program products for configuring and allocating software product technical services. In one embodiment, software product technical services for a developing software product are configured. A service policy configuration defining one or more service models for the developing software product is received. A software product taxonomy for the developing software product is received. The software product taxonomy includes one or more themes corresponding to different portions of the developing software product's functionality. The product taxonomy indicates one or more technical services for each theme that are available to entities developing other software that is to interact with the developing software product.

A service profile for an entity that is developing other software that is to interact with the developing software product is received. The profile includes context on how the entity intends to utilize the developing software product to interact with the other software. The entity is authorized to utilize technical services associated with the developing software product's themes in accordance with one of the service models in response to receiving the service profile.

In other embodiments, software product technical services for a developing software product are allocated to an appropriate service provider. A service request from an entity that is developing other software to interact with the developing software product is received. The service request selection is made from a menu that lists themes and technical services associated with the developing software product. A service provider that is to respond to at least one service question included in the service request is identified based on request allocation criteria.

The service request is allocated to the identified service provider. An answer to the at least one service question is received from the identified service provider. The entity is at least notified of the existence of the received answer.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
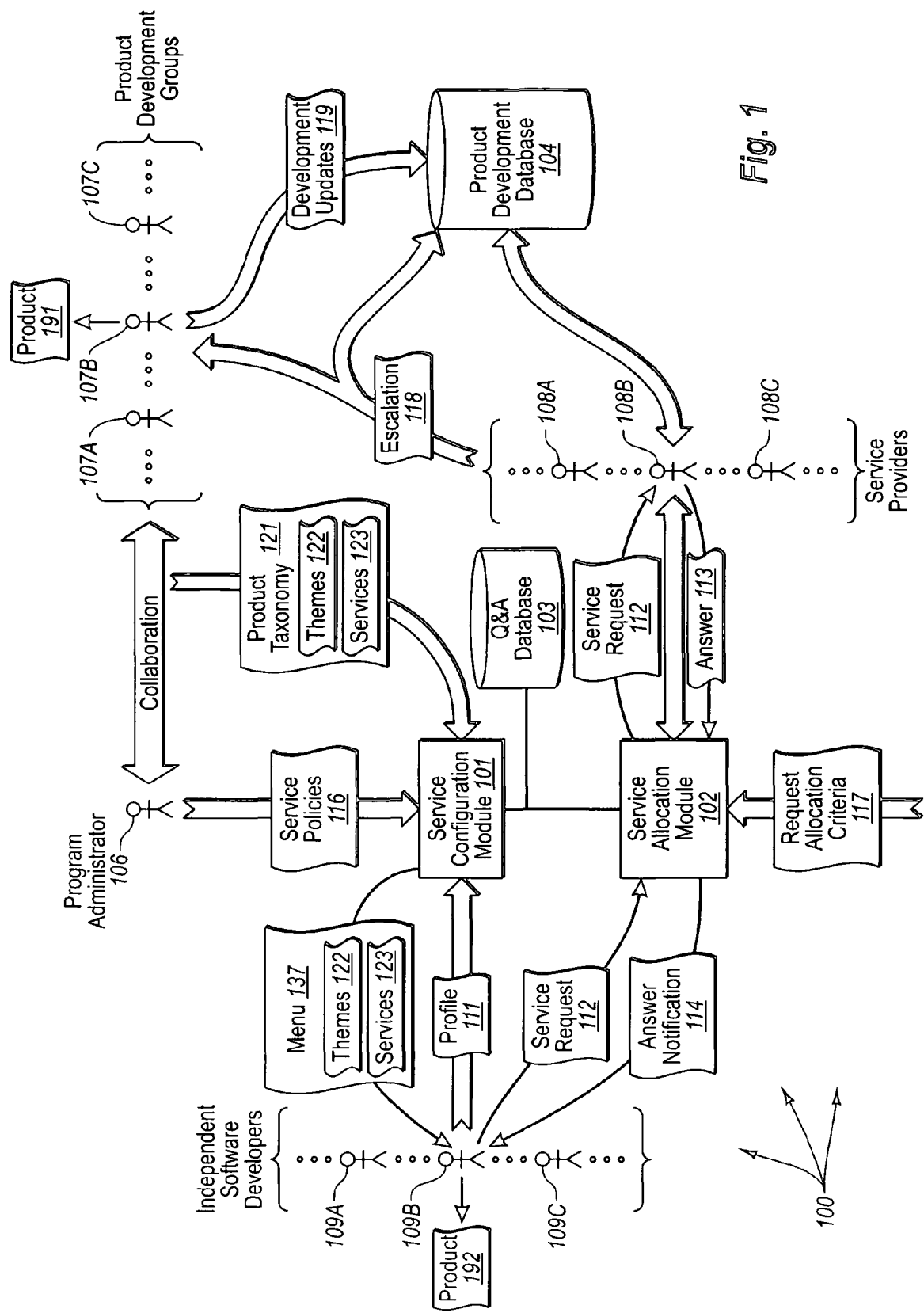
FIG. 1 illustrates an example computer architecture that facilitates configuring and allocating software product technical services.

The present invention extends to methods, systems, and computer program products for configuring and allocation software product technical services. In one embodiment, software product technical services for a developing software product are configured. A service policy configuration defining one or more service models for the developing software product is received. A software product taxonomy for the developing software product is received. The software product taxonomy includes one or more themes corresponding to different portions of the developing software product's functionality. The product taxonomy indicates one or more technical services for each theme that are available to entities developing other software that is to interact with the developing software product.

A service profile for an entity that is developing other software that is to interact with the developing software product is received. The profile includes context on how the entity intends to utilize the developing software product to interact with the other software. The entity is authorized to utilize technical services associated with the developing software product's themes in accordance with one of the service models in response to receiving the service profile.

In other embodiments, software product technical services for a developing software product are allocated to an appropriate service provider. A service request from an entity that is developing other software to interact with the developing software product is received. The service request selection is made from a menu that lists themes and technical services associated with the developing software product. A service provider that is to respond to at least one service question included in the service request is identified based on request allocation criteria.

The service selection request is allocated to the identified service provider. An answer to the at least one service question is received from the identified service provider. The entity is at least notified of the existence of the received answer Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise, computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions.

The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of a computer architecture 100 that facilitates configuring and allocating software product technical services. Depicted in computer architecture 100 are various components including service configuration module 101, service allocation module 102, Q & A database 103, and product development database 104. Also depicted in computer architecture 100 are the following entities: program administrator 106, product development groups 107A-107C, service providers 108A-108C, and independent software developers 109A-109C. A horizontal or vertical series of two periods (an ellipsis or vertical ellipsis respectively) represents that other entities can exist before, between, and after the expressly depicted entities. Each of these entities represents a combination of one or more human beings and corresponding one or more computers used by the one or more human beings.

Product development groups 107A-107C can represent a plurality of different groups of software developers within the same company and the computers they use to develop software. Each product development group can be associated with a different software product. For example, within the same company, product development group 107A may be developing an operating system, product development group 107B may be developing a database system, and 107C may be developing a database system.

As development updates occur, product development groups can update a product development database to provide documentation of the updates. For example, product development group 107B can send development updates 119 to product development database 104 (e.g., a relational database).

Independent software developers 109A-109C can represent a plurality of different companies and/or individuals that are developing software to interoperate with the software products being developed by product development groups 107A-107C and the computers each of these different companies and/or individuals use to develop software. Thus it may be that as independent software developers 109A-109C developer their software, they require technical support for the software products being developed by product development groups 107A-107C. For example, it may be that independent software developer 109A is developing a word processor for use with the operating system being developed by product development group 107A in parallel with the development of the operating system. Thus, from time to time, as both the word processor and operating system are developed, independent software developer 109A may require technical support for the operating system.

Service providers 108A-108C can represent a plurality of different companies and/or individuals that that provide technical services for software products being developed by product development groups 107A-107C and the computers each of these different companies and/or individuals use to provide technical services. For example, each of the service providers 108A-108C (as well as other service providers) can provide support for one or more of the software products being developed by product development groups 107A-107C (as well as other product development groups). Service providers 108A-108C can have various levels of general and specialized expertise in providing technical services for different software products. Different service providers can be located in various different geographical locations, such as, for example, in different states, countries, and continents. Thus, different services providers can also speak different languages and may heave different hourly rates for providing technical services.

Program administrator 106 can represent one or more administrators of a technical services program and computers used to administer the technical service program. For example, program administrator 106 can administer a technical services program for software products being developed (e.g., beta versions) by product development groups 107A-107C. Administrator 106 can administer service configuration module 101 and service allocation module 102 to monitor and control the configuration and allocation of technical services for developing software products.

Each of the various components and entities depicted in computer architecture 100 can be connected to a network, such as, for example, a Local Area Network ("LAN"), a Wide Area Network ("WAN"), or even the Internet. Thus, the various components and entities can receive data from and send data to other components and entities connected to the network. Accordingly, the components and entities can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. For example, components and entities can exchange Simple Object Access Protocol ("SOAP") envelopes containing Web service related data.

Generally, service configuration module 101 is configured to receive service polices for a developing software product (e.g., a beta version of a yet to be publicly released application), receive a software product taxonomy for the developing software product, and receive a service profile for an entity that desires to use technical services associated with the developing software product and authorize the entity to utilize the software technical services associated with the developing software product.

A product taxonomy can include one or more themes and corresponding technical services (e.g., engineering guidance, architectural guidance, bug checking, etc.) associated with those themes. A theme can be a portion of a developing software product's functionality that is of interest to independent software developers (e.g., to independent software vendors and enterprise developers). Each theme can include one or more technical services that are offered for that theme. Each technical service can be associated with a pre-set hour estimate, description of the service, necessary information, and planned deliverables.

A service policy can classify levels of service investment and technical experience offered for different independent software developers that may request technical services. Service (e.g., allotted service hours, allotted service options, program duration, and messaging) and technical experience can vary based on the size, strategic importance, and type of independent software developer. For example, entities developing more complex software can be allocated more service options, more service hours and more technically proficient service providers. On the other hand, entities developing less complex software can be allocated fewer service hours, fewer service options, and less technically proficient service providers.

For example, a beta program for a developing software product (e.g., an operating system) that will be utilized by a plurality of other software (e.g., applications that are to run on the operating system) can offer varied levels of service to the entities that develop the other software. Service levels can be varied based on whether the entity is an independent software vendor or an enterprise developer, whether the entity is a small, medium, or large entity, and whether there is a strategic relationship with the entity. Service levels can be used to filter what technical services are offered to an independent software developer for a specified theme.

An independent software developer's size, strategic importance, and type can be include in a profile that is submitted from the independent software developer to the service configuration module. For example, each independent software developer can be required to submit a profile that includes size, a description of the software that they will be testing, environmental information including supported APIs, interdependent technologies and $3^{rd}$ party products, planned beta and completion dates of their project. Further, each rendered service request can confirm that the profile is accurate. The developer is therefore motivated to keep the data current and accurate. In some embodiments, independent software developers are provided a web-based form where the questions use multiple-choice prompting data that is defined in a configuration file for a developing software product.

After an independent software developer's profile is received, service configuration manager 101 can identify technical services from a software product taxonomy that are to be offered to the independent software developer based on service polices and responses included in the received profile. Offered technical services can be presented to the independent software developer at a menu-based interface. In some embodiments, a Web-based interface is presented via a computer network, such as, for example, the Internet. The independent software developer can view offered technical services and associated information, such as, for example, hour estimates, service descriptions, and planned deliverables, at the menu-based interface. The independent software developer can also select an offered technical service from the menu-based interface.

Service allocation module 102 is configured receive service requests and allocate service requests to an appropriate service provider. Service allocation module 102 can allocate a service request based on request allocation criteria, such as, for example, an existing relationship between a independent software developer and a service provider, competency in a specified language, capacity to service a service request, satisfaction scores from independent software developers, a service providers areas of technical expertise, etc. Request allocation criteria can be included in a service request, maintained at service allocation module 102, and/or dictated by service policies 116.

In some embodiments, a service request is allocated to an optimum service provider for servicing the service request based on request allocation criteria. For example, a routing algorithm can be used to match request allocation criteria (e.g., need architectural guidance in Korean) and service provider characteristics (e.g., has ten architects on staff and is located in Seoul, Korea) to provide an optimum match.

Upon receiving a service request, a service provider can attempt to answer one or more questions included in the service request. If necessary, the service provider can escalate the service request. For example, the service provider can refer to a product development database maintained by product development groups or can query the product development groups directly. When an answer is formulated, the service provider can send the answer back to service allocation module 102.

Service allocation module 102 can store questions from the service request and corresponding answers in Q & A database 103. Service allocation module 102 can send any answers or a notification that the answers have been received back to the independent software developer that initiated the service request. When appropriate, the independent software developer can access the answers through service allocation module 102, for example, from Q & A database 103.

Figure 2:
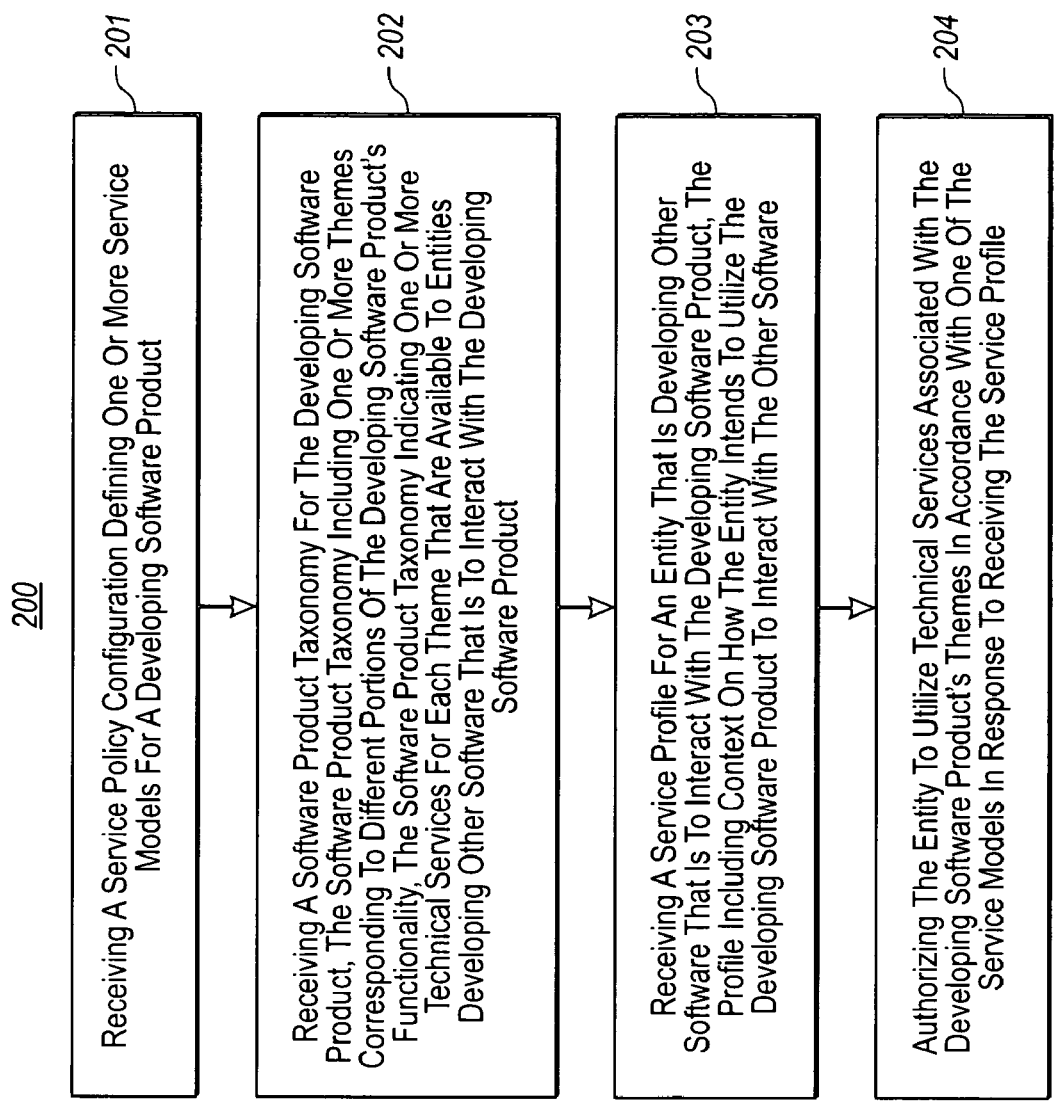
FIG. 2 illustrates a flow chart of an example method for configuring software product technical services for a developing software product.

FIG. 2 illustrates a flow chart of an example method 200 for configuring software product technical services for a developing software product. Method 200 will be described with respect to the components, entities, and data in computer architecture 100.

Method 200 includes an act of receiving a service policy configuration defining one or more service models for a developing software product (act 201). For example, service configuration module 101 can receive service policies 116 from program administrator 106. Service policies 116 can define one or more service models (e.g., type and quantity of technical services per type of independent software developer) for software product 191 (being developed by product development group 107B).

Method 200 includes an act of receiving a software product taxonomy for the developing software product (act 202). For example, service configuration module 101 can receive product taxonomy 121 for product 191. Program administrator 106 and product development 107B can collaborate to create product taxonomy 121. A software product taxonomy can include one or more themes corresponding to different portions of the developing software product's functionality. For example, product taxonomy 121 includes themes 121 corresponding to different portions of product 191's functionality. A software product taxonomy can also indicate one or more technical services for each theme that are available to entities developing other software that is to interact with the developing software product. For example, product taxonomy 121 includes services 123 that indicate technical services available for themes 122.

Method 200 includes an act of receiving a service profile for an entity that is developing other software that is to interact with the developing software product (act 203). For example, service configuration module 101 can receive profile 111 from independent software developer 109B that is developing product 192. A profile can include context on how the entity intends to utilize the developing software product to interact with the other software. For example, profile 111 can include context on how independent software developer 109B intends to utilize product 191 to interact with product 192 (e.g., supported APIs, interdependent technologies and $3^{rd}$ party products, planned beta and completion dates of their project, etc.). Profile 111 can also include any relevant business information, such as, for example, a contact person, size, location, preferred language, etc.

Method 200 includes an act of authorizing the entity to utilize technical services associated with the developing software product's themes in accordance with one of the service models in response to receiving the service profile (act 204). For example, service configuration module 101 can authorize independent software developer 109B to utilize services 123 in accordance with a service model of service policies 116 in response to receiving profile 111. Based on profile 111, service configuration module 101 may determine that independent software developer 109B is authorized to use only a subset of services 123.

Figure 3:
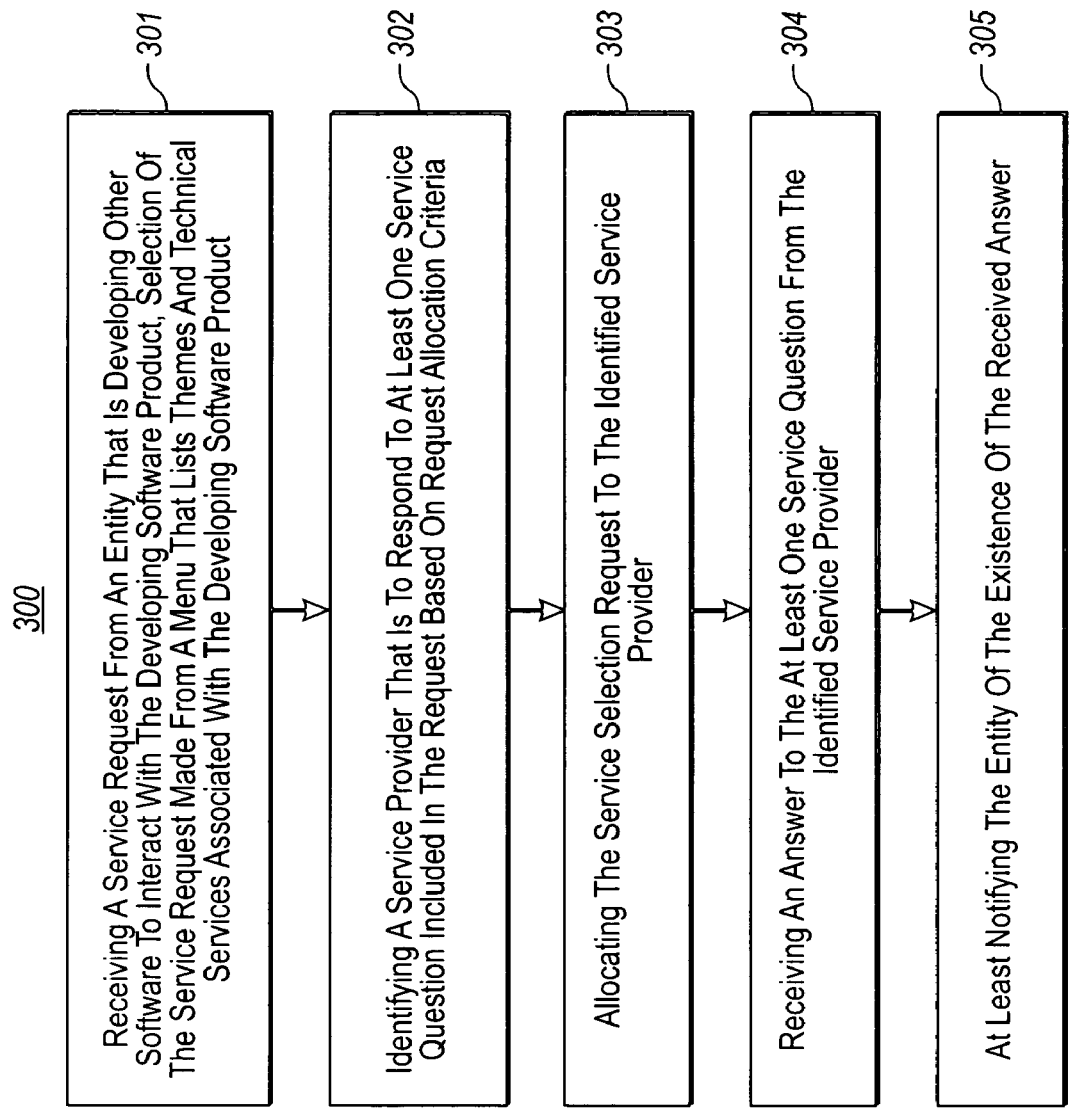
FIG. 3 illustrates a flow chart of an example method for allocating software product technical services for a developing software product to an appropriate service provider.

FIG. 3 illustrates a flow chart of an example method 300 for allocating software product technical services for a developing software product to an appropriate service provider. Method 300 will be described with respect to the components, entities, and data in computer architecture 100.

Method 300 includes an act of receiving a service request from an entity that is developing other software to interact with the developing software product (act 301). For example, service allocation module 102 can receive service request 112 from independent software developer 109B. A service request can be selected from a menu that lists themes and technical services associated with the developing software product. For example, independent software developer 109B can select an entry from a menu 137 (a menu-based interface presenting themes 121 and services 123) to cause service request 112 to be sent.

A software request can include one or more technical questions as well as additional and/or updated profiling information. For example, service request 112 can include one or more technical questions related to the interoperation of product 192 and product 191. Service request 112 can also include additional and/or updated profiling information about product 192 and/or independent software develop 109B. In some embodiments, service policies dictate that profile information is to be update before any technical services are provided. For example, service policies 116 can dictate that a profile of independent software developer 109 and/or of product 192 is up to date before any service requests from independent software developer 109 are processed.

Method 300 includes an act of identifying a service provider that is to respond to at least one service question included in the service request based on request allocation criteria (act 302). For example, service allocation module 102 can identify that service provider 108B is to respond to a service question in service request 112 based on request allocation criteria 117. Request allocation criteria 117 can be included in service request 112, accessed form a storage location associated with service allocation module 102, and/or dictated by service polices 116. As previously described request allocation criteria can include: an existing relationship between a independent software developer and a service provider, competency in a specified language, capacity to service a service request, satisfaction scores from independent software developers, a service provider's areas of technical expertise, etc.

Method 300 includes an act of allocating the service request to the identified service provider (act 303). For example, service allocation module can allocate service request 112 to service provider 108B. Service provider 108B can formulate an answer to an included service question. When appropriate, service provider 108B can escalate a service question. For example, service provider 108B can send escalation 118 directly to product development group 107B or to product development database 104 (e.g., a relational database). Escalation to a product development group can include forwarding a service request and/or sending another type of electronic message to the product development group. Escalation to a product development database can include querying the product development database for development updates (e.g., development updates) provided by product development groups (e.g., product development group 107B).

Based on its expertise and/or information obtained through escalation, service provider 108C can return an answer to a service question included in service request 112. For example, service provider 108C can send answer 113 to service allocation module 102.

Method 300 includes an act of receiving an answer to the at least one service question from the identified service provider (act 304). For example, service allocation module 102 can receive answer 113. Method 300 includes an act of at least notifying the entity of the existence of the received answer (act 305). For example, service allocation module can send answer notification 114 to independent software developer 109B.

Service allocation module can also store a service question/answer pair in Q & A database 103. Q & A database 103 can be used as a knowledge base to answer questions similar to those included in service request 112 in the future. Reference to service question/answer pairs in Q & A database 103 (e.g., in response to a need for technical services) can reduce the overall number of service requests that are submitted. Q & A database 103 can be a relational database.

In response to answer notification 114, independent software developer 109B can access Q & A database 103 to obtain answers to questions included in service request 112. Alternately or in combination with storage in Q & A database 103, service allocation module 102 can send answers directly to independent software developer 109B. Software developer 109B can use answers to facilitate better interoperation between product 192 and product 191.

Embodiments of the present invention enable independent software developers from diverse geographical locations to engage with beta software products and obtain both support and guidance services in a more automated manner. For example, globally distributed independent software developers can be matched up with (e.g., facilitated by a service allocation module) globally distributed service providers. Accordingly, technical services for beta products can be provided to independent software developers with increased cost-effectiveness and increased timeliness.

Embodiments of the present invention also facilitate providing technical services for a developing software product to independent software developers without significantly burdening a corresponding development group.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including a processor and system memory, a method for configuring the offering of technical assistance services for a developing software product, the developing software product being developed by a plurality of different product development groups, one or more other software developers developing other software products that are to depend on at least a portion of the developing software product, the method comprising:

an act of receiving a service policy configuration defining one or more service models for the developing software product, the developing software product having a functionality defined by the plurality of different development groups, changes to the functionality of the developing software product being determined by at least one group of the plurality of different development groups, such that changes to the functionality of the developing software product are determined independent of the one or more other software developers developing other software products that are to depend on at least a portion of the developing software product, each service model corresponding to a specified type of software developer that is developing another software product that is to depend on at least a portion of the functionality of the developing software product, each service model defining a type and quantity of technical assistance services to be offered to a software developer when it is determined that the software developer is of the corresponding specified type of software developer;

an act of receiving a software product taxonomy for the developing software product, the software product taxonomy including one or more themes corresponding to different portions of the developing software product's functionality, the software product taxonomy indicating one or more technical assistance services for each theme that are to be available to the other software developers developing software products that are to depend on the developing software product;

an act of receiving a service profile for an entity that is developing another software product that is to depend on the developing software product, the profile including context on how the entity intends to design the other software product to depend on the functionality of the developing software product, wherein changes to the functionality of the developing software product cause changes in the context on how the entity intends to design the other software product;

an act of identifying a type of the software developer corresponding to the entity;

an act of assigning a specified service model, from among the defined one or more service models, to the entity based on the identified type of software developer corresponding to the entity;

an act of the processor identifying portions of the developing software product's functionality that are to be used to cause the other software product to depend on the developing software product as indicated in the context;

an act of identifying one or more themes applicable to the entity based on the identified portions of the developing software product's functionality; and an act of authorizing the entity to request technical assistance services associated with the identified one or more themes in accordance with identified service model in response to receiving the service profile.

2. The method as recited in claim 1, wherein the act of receiving a service policy configuration defining one or more service models for the developing software product comprises an act of receiving a service policy configuration that indicates allotted service hours, allotted service options, program duration, and messaging.

3. The method as recited in claim 1, wherein the act of receiving a software product taxonomy for the developing software product comprises an act of receiving a software product taxonomy developed through collaboration between a technical services program administrator and a product development group developing the developing software product.

4. The method as recited in claim 1, wherein the act of receiving a service profile for an entity that is developing another software product that is to depend on the developing software product comprises an act of receiving a service profile for an independent software vendor.

5. The method as recited in claim 1, wherein the act of receiving a service profile for an entity that is developing another software product that is to depend on the developing software product comprises an act of receiving a service profile for an enterprise developer.

6. The method as recited in claim 1, wherein the act of receiving a service profile for an entity that is developing another software product that is to depend on the developing software product comprises an act of receiving a service profile including context, selected from among supported APIs, interdependent technologies, $3^{rd}$ party products, and business information, that indicates how the entity's other software product is to depend on the developing software product.

7. The method as recited in claim 1, wherein the act of authorizing the entity to request technical assistance services associated with the identified one or more themes comprises an act of authorizing the entity to request a specified amount of one or more types of human based technical assistance services.

8. The method as recited in claim 1, wherein the developing product comprises a version of an operating system and the other software product comprises an application that is to run on the version of the operating system.

9. At a computer system, the computer system including a processor and system memory, a method for providing technical assistance services for a developing software product, the developing software product being developed by a plurality of different product development groups, one or more other software developers developing other software products that are to depend on at least a portion of the developing software product, the technical assistance service allocated to a software developer to assist the software developer in developing a dependent software product, the method comprising:

an act of a service allocation module receiving a service request for technical assistance services from a software developer that is developing another software product that is depend on at least a portion of the functionality of the developing software product, the service allocation module controlling the allocation of service requests to a plurality of different service providers, the developing software product having a functionality defined by the plurality of different development groups, changes to the functionality of the developing software product being determined by at least one group of the plurality of different development groups, such that changes to the functionality of the developing software product is determined independent of the one or more other software developers developing other software products that are to depend on at least a portion of the developing software product and wherein changes to the functionality of the developing software product cause changes in the technical assistance;

an act of accessing request allocation criteria for the software developer, at least one request allocation criterion included in the service request, at least one request allocation criterion maintained at the service allocation module;

an act of the processor identifying an optimum service provider, from among the plurality of service providers, for servicing the service request by matching the accessed request allocation criteria and service provider characteristics to provide a match in accordance with a routing algorithm;

an act of sending the service request to the optimum service provider;

an act of receiving an answer to the to the service request from the identified service provider, the answer is based at least in part on the service provider's expertise with respect to the at least one portion of the developing software product's functionality that the other software product is to depend on; and an act of at least notifying the software developer of the existence of the received answer.

10. The method as recited in claim 9, wherein the act of receiving a service request for technical assistance services from a software developer comprises an act of receiving a service request that includes updated profile information for the software developer.

11. The method as recited in claim 9, wherein the act of identifying an optimum service provider that is to respond to the service request comprises an act of identifying a service provider based on one or more of an existing relationship between the entity and a product development group developing the developing software product, competency in a specified language, capacity to service the service request, satisfaction scores from independent software developers, and a service provider's areas of technical expertise.

12. The method as recited in claim 9, wherein the act of identifying an optimum service provider that is to respond to the service request comprises an act of identifying a service provider from a service providers that are located in different locations around the world.

13. The method as recited in claim 9, wherein the act of identifying an optimum service provider that is to respond to the service request an act of identifying a service provider based on routing criteria included in a previously received service policy for the developing software product.

14. The method as recited in claim 9, wherein the act of receiving an answer to the service request from the identified service provider comprises an act receiving an answer to the service request that was formulated through escalation one of the plurality of different product development groups developing the developing software product.

15. The method as recited in claim 9, wherein the act of receiving an answer to the service request from the identified service provider comprises an act receiving an answer to the at least one service question that was formulated through escalation to a product development database.

16. The method as recited in claim 9, where in the act of at least notifying the software developer of the existence of the received answer comprises an act of sending the answer to the software developer.

17. The method as recited in claim 9, further comprising:
an act of storing the answer in a knowledge base.

18. A computer program product for use at a computer system, the computer program product for implementing a method for allocating software product technical services for a developing software product to an appropriate service provider, the computer program product comprising one or more computer-readable storage media having stored thereon computer-executable instructions that, when executed by a processor, cause the computer system to perform the following:

receive a service request for technical assistance services from a software developer that is developing another software product that is depend on at least a portion of the functionality of the developing software product, the service allocation module controlling the allocation of service requests to a plurality of different service providers, the developing software product having a functionality defined by the plurality of different development groups, changes to the functionality of the developing software product being determined by at least one group of the plurality of different development groups, such that changes to the functionality of the developing software product is determined independent of the one or more other software developers developing other software products that are to depend on at least a portion of the developing software product and wherein changes to the functionality of the developing software product cause changes in the technical assistance;

access request allocation criteria for the software developer, at least one request allocation criterion included in the service request, at least one request allocation criterion maintained at the service allocation module;

identify an optimum service provider, from among the plurality of service providers, for servicing the service request by matching the accessed request criteria and service provider characteristics to provide a match in accordance with a routing algorithm;

send the service request to the optimum service provider;

receive an answer to the to the service request from the identified service provider, the answer is based at least in part on the service provider's expertise with respect to the at least one portion of the developing software product's functionality that the other software product is to depend on; and at least notify the software developer of the existence of the received answer.

19. The computer-program product as recited in claim 18, wherein computer-executable instructions that, when executed by a processor, cause the computer system to identify an optimum service provider that is to respond to the service request comprise computer-executable instructions that, when executed by a processor, cause the computer system to identify an optimum service provider based on one or more of an existing relationship between the software developer and a product development group developing the developing software product, competency in a specified language, capacity to service the service request, satisfaction scores from independent software developers, and a service provider's areas of technical expertise.

20. The computer-program product as recited in claim 18, wherein computer-executable instructions that, when executed by a processor, cause the computer system to identify an optimal service provider that is to respond to the service request comprise computer-executable instructions that, when executed by a processor, cause the computer system to identify an optimum service provider from a number of different service providers that are located in different locations around the world.

* * * * *